United States Patent
Weiss

[11] Patent Number: 5,976,619
[45] Date of Patent: Nov. 2, 1999

[54] PROCESS AND DEVICE FOR PRODUCTION COATINGS

[75] Inventor: Hans Karl Weiss, Vienna, Austria

[73] Assignee: Sewer Coating Systems Verbundmaterialienentwicklungs-und Vertriebsgesellschaft m.b.H., Vienna, Austria

[21] Appl. No.: 08/897,610

[22] Filed: Jul. 21, 1997

Related U.S. Application Data

[63] Continuation of application No. PCT/AT96/00005, Jan. 18, 1996.

[30] Foreign Application Priority Data

Jan. 19, 1995 [AT] Austria ......................................... 78/95

[51] Int. Cl.⁶ ................... B05D 7/22; B05C 1/02
[52] U.S. Cl. .................. 427/238; 427/230; 427/181; 118/DIG. 10; 118/254; 118/306; 118/317
[58] Field of Search ........................... 118/DIG. 10, 317, 118/306, 408, 254; 427/181, 202, 230, 236, 238; 134/166 R, 166 C, 8, 22.1, 22.11, 22.18

[56] References Cited

FOREIGN PATENT DOCUMENTS

| | | |
|---|---|---|
| 0 115 993 | 8/1984 | European Pat. Off. . |
| 0 450 975 | 10/1991 | European Pat. Off. . |
| 39 31 775 | 4/1991 | Germany . |
| 41 26 310 | 2/1992 | Germany . |
| 44 03 370 | 8/1995 | Germany . |
| WO93/13350 | 7/1993 | WIPO . |

*Primary Examiner*—David A. Simmons
*Assistant Examiner*—Calvin Padgett
*Attorney, Agent, or Firm*—Jacobson, Price, Holman, Stern, PLLC

[57] ABSTRACT

A device for coating the internal surfaces of elongate hollow spaces includes a shield substantially corresponding to the cross section of the hollow space and capable of being displaced in the longitudinal direction of the hollow space by means of a bogie connected therewith. The shield is connected with supply ducts for a curable mass being in the plastic state. The supply ducts are provided with outlet openings substantially uniformly distributed about the periphery of the cross section of the hollow space. A blower is provided with a seat for a flexible tube capable of being pressed at the hollow space to be coated and substantially air-tight relative to the inner side and includes a supporting element capable of being stationarily anchored within the hollow space. The shield is provided with a central opening intended for the passage of the flexible tube containing a fiber material in addition to the impermeable layer. The supply ducts are connected with a distributing means for the curable mass carried by the bogie and terminate in pipes arranged about the external periphery of the shield. The outlet openings of the pipes substantially are formed by a cut led obliquely to the longitudinal axes of the pipes, terminating on the pipe enveloping lines next to the internal wall of the hollow space.

15 Claims, 3 Drawing Sheets

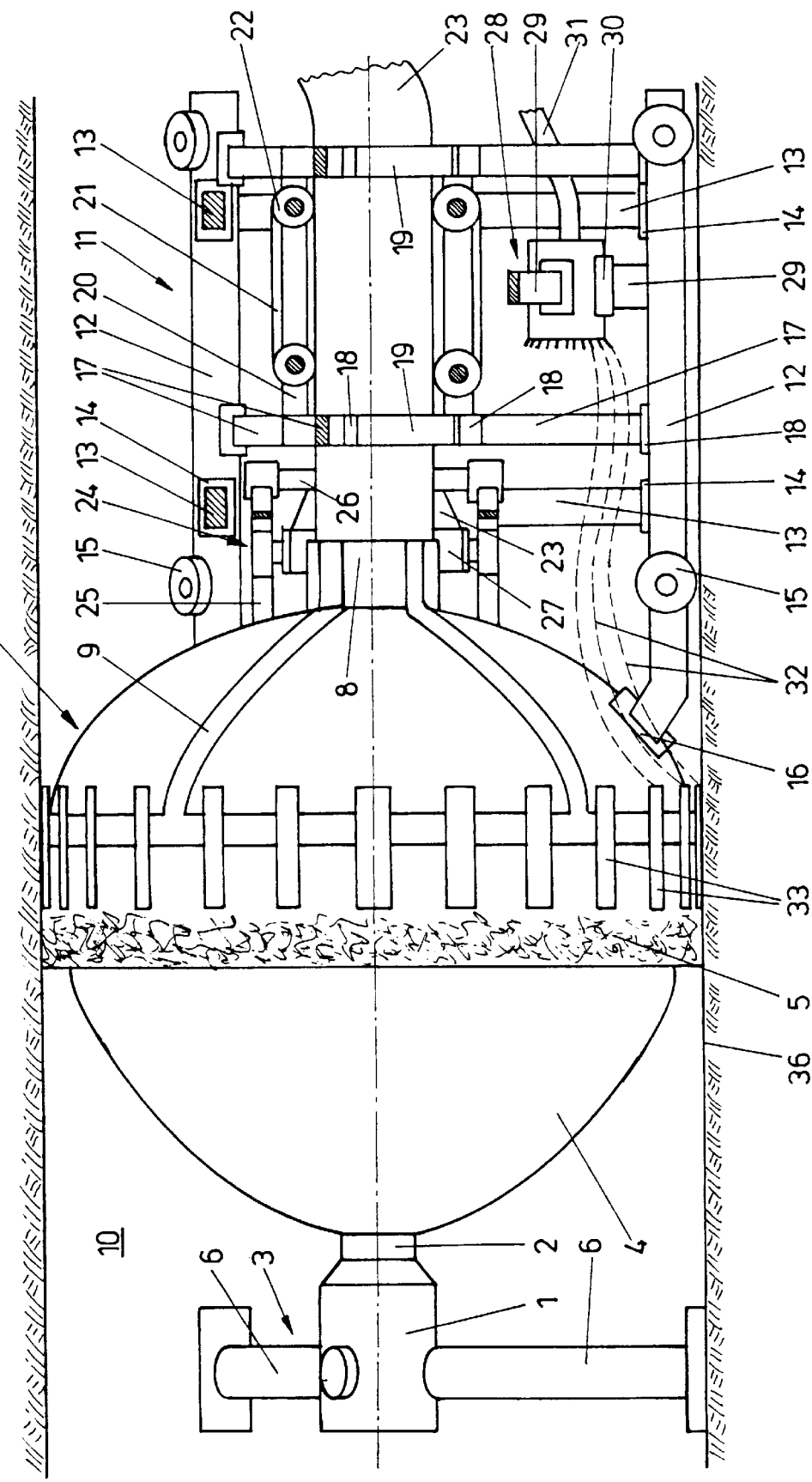

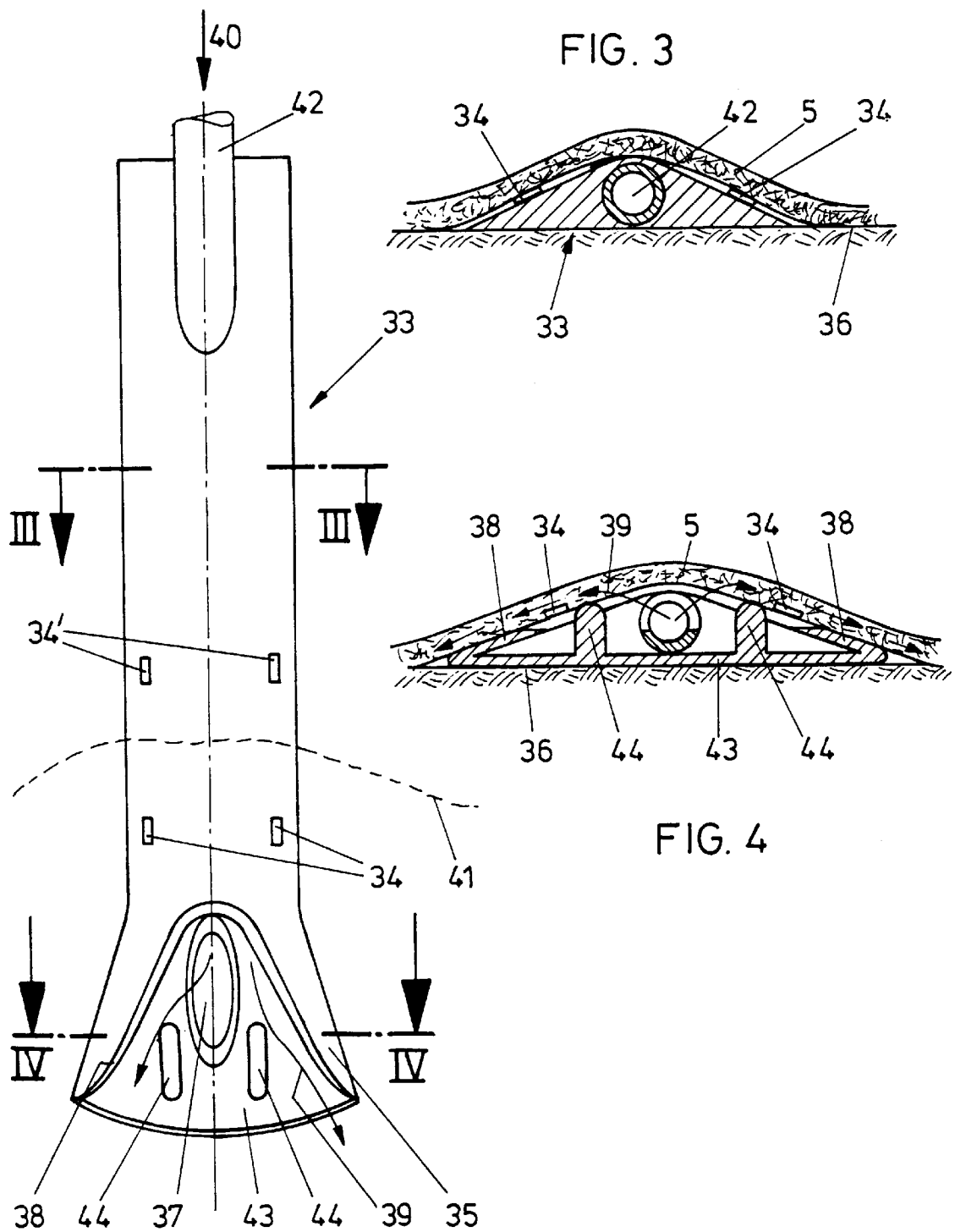

PROCESS AND DEVICE FOR PRODUCTION COATINGS

This application is a continuation of PCT/AT96/00005, filed Jan. 18, 1996.

BACKGROUND OF THE INVENTION

1. Field of the Invention

The invention relates to a device for coating the internal surfaces of elongate hollow spaces, such as ducts or channels, which device comprises a shield substantially corresponding to the cross section of the hollow space and capable of being displaced in the longitudinal direction of the hollow space by means of a bogie connected therewith, which shield is connected with supply ducts for a curable mass being in the plastic state, which supply ducts are provided with outlet openings substantially uniformly distributed about the periphery of the cross section of the hollow space, wherein a blower is provided with a seat for a flexible tube capable of being pressed at the hollow space to be coated and substantially air-tight relative to the inner side and comprises a supporting means capable of being stationarily anchored within the hollow space. The invention, furthermore, relates to a process for applying a coating of a fiber-reinforced curable mass including a binder onto a substrate, in particular, the internal wall of a channel or the like, using such a device.

2. Prior Art

With known processes of this type, such fibers in the preparation of a curable mass are admixed, optionally in the form of bundles of fibers held together by aid of a binder dissolving in the mass. In doing so, the problem arises that a sufficiently uniform distribution of the fibers, whose specific weight usually is considerably lower than that of the mass, in the same frequently is only very hard to obtain involving considerable expenditures. Moreover, the filling ratio of the mass with fibers obtained in this manner is rather moderate.

A method of this type has become known, for instance, from WO-A 93/13350, wherein a layer of mutually engaging fibers is applied onto a substrate and this layer is soaked with a mass being in the plastically deformable state, whereupon the mass is allowed to cure.

Furthermore, devices for coating the internal walls of hollow bodies, e.g., channels are known. Examples for such devices are described, for instance, in DE-A 39 31 775 or DE-A 41 26 310.

In the known devices, there is provided a tubular encasing which externally comprises a peripheral seal projecting towards the internal wall of a channel to be coated. Viewed in the advance direction of the device, the outflow openings of the supply ducts for the curable mass are provided behind the seal. That region is followed by a region in which an elastically widenable flexible tube attached to the outer side of the encasing is inflatable by compressed air in order to distribute, and coarsely smooth, the emerging curable mass. Behind that region, a shield is arranged, which is comprised of spreadable segments and serves to smoooth the coating applied. In the device moving in the advance direction, the shield constitutes the end of the same.

Such a device involves the drawback of being very heavy and bulky. Due to a considerable friction prevailing between the seal and the inflatable flexible tube and, last but not least, between the shield and the internal wall of the hollow space to be coated, the device, moreover, requires a highly efficient actuating means in order to be able to move the device at all, which brings about problems also in respect of the transmission of the driving force to the internal wall of the hollow space. In addition, coatings strongly enriched with fibers cannot be readily applied by means of said known devices.

SUMMARY OF THE INVENTION

It is an object of the invention to propose a device of the initially defined kind, which is suitable for coating the internal walls of hollow bodies, in particular, channels or the like, and which stands out for its simple structure.

Departing from a device of the initially defined kind, the device according to the invention with a view to solving the above object substantially is characterized in that the shield is provided with a central opening intended for the passage of the flexible tube containing a fiber material in addition to the impermeable layer and the supply ducts are connected with a distributing means for the curable mass carried by the bogie and terminate in pipes arranged about the external periphery of the shield, the outlet openings of which pipes substantially are formed by a cut led obliquely to the longitudinal axes of the pipes, terminating on the pipe enveloping lines next to the internal wall of the hollow space. By the measures proposed according to the invention, it has become possible to obviate the very heavy rigid encasing provided in the known case. A flexible tube provided with an externally attached fiber layer is handleable in a simple manner. It will do to pass the same in the packed state through the opening provided in the shield and connect it to the blower stationarily retained within the hollow space, the opening having to be dimensioned such that the flexible tube is maintained in the packed state, thereby largely preventing air from flowing into the flexible tube region located in front of the shield, viewed in the advance direction of the device.

By blowing air into that portion of the flexible tube which is present behind the shield or between the shield and the blower, viewed in the advance direction of the device, the flexible tube is inflated, thus coming to bear against the internal wall of the hollow space to be coated. The pipes provided about the external periphery of the shield are located between the internal wall of the hollow space and the fiber layer of the flexible tube such that the curable mass may be introduced through the pipes between the internal wall of the hollow space and the fiber layer.

Since the outlet openings of the pipes are directed substantially towards the fiber layer, the latter is soaked with the curable mass. As a result, the curable mass also gets between the outer side of the flexible tube and the fiber layer such that the latter is scoured by the curable mass and a thin layer poor of fibers and having a very smooth surface is formed.

The whole device except for the blower stationarily held within the hollow space may be displaced in the advance direction as a function of the operating progress, wherein the flexible tube is gradually inflated and the curable mass is introduced between the internal wall of the hollow space and the fiber layer of the flexible tube, whereby the curable mass unites with the internal wall and reaches a high strength, in particular, also tensile strength, due to the very high fiber filling ratio.

Hydraulically setting masses, preferably based on white cement including additives and setting accelerators, have proved successful as curable masses. In principle, any other curable masses, for instance, those based on synthetic resins may be used as well.

Depending on the stresses expected to be exerted on the lining layer, the fiber material may comprise natural or synthetic fibers or even metal fibers. It is of particular advantage if a needle felt is used as said fiber layer. Such a needle felt is very easy to handle and may be produced relatively dense, thus yielding a particularly high filling ratio of the lining layer.

According to a preferred embodiment, it is provided that the shield is connected with at least two cutting means and two coiling means capable of being driven to receive strips of the packing tube. This has the advantage that even fiber-layer-comprising flexible tubes packed in a packing tube are readily handleable, while it is also safeguarded that the flexible tube cannot be inflated in the region located in front of the shield, viewed in the advance direction of the device, being retained within the packing tube. It is suitable to arrange the cutting means and the coiling means as close to the shield as possible.

Due to the fact that the shield or its bogie, respectively, is in connection with at least two drivable rollers or circulating belts arranged in the region of a cross sectional plane of the hollow space and provided for application at the flexible tube, as in accordance with another preferred embodiment, it is feasible to control the advance speed of the device by appropriately driving the wheels or circulating belts contacting the outer side of the flexible tube or packing tube, respectively. It is not necessary to apply via these wheels or circulating belts all of the force that is required for advancing, which force would have to be taken up by the flexible tube. The main portion of the force required for advancing is applied by the stationarily retained blower, the air blown into the flexible tube pressing the shield away. Depending on the surface of the shield, relatively low pressures will already be sufficient within the inflated flexible tube.

With a suitable pressure applied, which basically is a function of the force required for pressing the flexible tube at the internal wall of the hollow space to be coated, it may also happen that the advance movement of the device must be braked by the rollers or circulating belts contacting the flexible tube packed together or covered by the packing tube, in order to ensure sufficient soaking of the fiber layer with the curable mass.

According to a further preferred configuration, it is provided that the shield and the bogie are designed in several parts and detachable fastening means, preferably snaps, are provided for connecting the individual parts. Hence results the advantage that the device may be introduced into a channel via access shafts available at channels or the like, anyway, and assembled there. Major diggings and local destruction of the cover or ridge region of the channel to be repaired may be obviated in order to be able to introduce the device into the same.

Due the fact that the pipes arranged about the external periphery of the shield have substantially triangular cross sections and the region of each respective outlet opening includes rims projecting towards the interior of the hollow space with an enlargement preferably being provided in this region, as in accordance with another preferred embodiment, it is ensured that only slight disturbances of the extension of the external periphery of the fiber layer of the flexible tube are caused in the region of the pipes and the emerging curable mass is able to distribute itself over a larger surface. Furthermore, the rims of the pipes provided in the region of their outflow openings constitute sort of a sealing relative to the fiber layer such that the emerging curable mass, which mostly is relatively fluent, will not flow along the pipe towards the shield, but will penetrate the fiber layer, soaking the same as far as to the flexible tube. Said rims also provide kind of free spaces in the region of the outflow openings such that these will not be obstructed by the fiber layer. In this connection, it is provided in a particularly preferred manner that the pipes in the region of the outflow openings, on their wall regions substantially lying at the internal wall of the hollow space are provided with ribs projecting towards the interior of the hollow space and extending in the longitudinal direction of the pipes.

According to another preferred configuration, at least two sensors known per se and arranged to be offset in the longitudinal direction of the pipes are provided in regions of the pipes close to the outflow openings on their sides facing the interior of the hollow space for detecting the curable mass, which sensors via signal lines are connected to a control circuit to which the blower and/or the actuating means of the drivable rollers or circulating belts is/are connected. It is, thus, feasible to detect the propagation of the curable mass emerging from the pipes and keep the same within a predetermined range by controlling the advance speed, the propagation of the curable mass in the direction towards the shield giving hints as to the soaking of the fiber layer. Furthermore, it is also feasible, by comparing the signals of the sensors of the individual pipes, to recognize any possible damage to one of the pipes, e.g., a break of the rim of the same.

Due to the fact that the distributing means connected with the supply ducts comprises an actuatable cylindrical rotor including a channel open on its outer surface area and provided with a feed duct for the curable mass, wherein the rotor rotates with but a slight play within a stator encompassing the same and provided with channels uniformly distributed about its circumference and passing through its wall, the number of which channels corresponds to the number of supply ducts and the pipes of the shield, respectively, and which channels are connectable with the supply ducts and, on their inlets facing the rotor, are located in the moving path of the stator-side opening of the channel of the rotor, as in accordance with a further preferred configuration, it has become feasible to supply the pipes in a predetermined order consecutively with equal portions of the curable mass. Thereby, the emergence of the curable mass substantially uniform about the periphery of the cross section of the hollow space to be coated is ensured and the influence of the hydrostatic pressure at a considerable extension of the cross section of the hollow space, e.g., channel, is largely eliminated in the vertical direction. Thus, the solution proposed offers the additional advantage of a very compact structure and simple construction.

In principle, the uniform emergence of the curable mass about the periphery of the cross section of the hollow space also would be ensured by means of an appropriate number of peristaltic pumps, yet such a solution would involve considerable space problems and also a substantially elevated energy demand for driving said pumps.

By the axis of the channel in the rotor and the axes of the channels in the stator preferably lying on a common imaginary surface area of a cone, sharp changes of direction of the flow of the curable mass are avoided, which might cause deposits of components of the curable mass due to the formation of whirls. The avoidance of sharp changes of direction is suitable, in particular, with curable masses containing superfines as additives.

The fact that the channel arranged in the rotor on its internal wall facing the axis of rotation preferably is connected with a bent pipe, one leg of which is mounted coaxial with the axis of rotation of the rotor in a supply casing to which a flexible tube carrying the curable mass is axially connected, results in a very simple construction of a distributing means.

In order to avoid differences in the emergence of the curable mass, in particular, at the start of the device all of the supply ducts advantageously have equal lengths between the distributing means and the pipes arranged on the outer edge of the shield.

Another object of the invention resides in avoiding the above-mentioned drawbacks of known processes and to provide a process of the initially-defined kind, using a device according to the invention, which may be realized in a simple manner and by which also a very high fiber filling ratio of the curable mass may be attained. To solve this object, the process of the initially defined kind essentially is characterized in that, by means of a displaceable shield, a layer of mutually engaging fibers, preferably forming a needle felt, is applied onto the substrate and this layer is soaked with the mass being in a plastically deformable state and applied through outlet openings in a manner distributed about the periphery of the substrate to be coated, whereupon the mass is allowed to cure. By the measures provided by the invention it has become feasible to produce coatings with very high portions of fibers most evenly distributed within the curable mass. Thereby, very high strengths may be obtained, for instance, with hydraulically setting masses.

Various fibers, yet preferably polypropylene fibers may be used, which, e.g., are used in the form of an entangled fiber web, yet preferably in the form of a needle felt. By the individual fibers mutually cohering, a very uniform distribution of the fibers in the mass after solidification of the same is ensured upon soaking with the mass, which preferably is in a very fluent state, the coating thus produced having excellent mechanical properties, such as a high tensile strength.

Moreover, with an appropriate retention of the fiber layer it is also possible to overflow the same with the rather highly liquid curable mass, thereby obtaining a thin layer substantially free of fibers and standing out for its smooth and dense surface after curing.

Due to the armouring provided according to the invention and formed by said fiber layer, a layer of curable mass may readily be applied even to bends having small radii.

The mass substantially may be composed in any desired manner, yet it is advantageous to provide a mass including a hydraulic binder, e.g., white cement, with fly ash, microsilicates, diluents and setting accelerators, such as, e.g., aluminum oxide, being admixable.

According to a preferred embodiment it is provided to apply the layer of mutually engaging fibers externally on a substantially air-tight flexible tube from the shield and that the flexible tube is progressively pressed at the internal wall of the channel or the like by blowing in air, while simultaneously pressing the mass being in a plastically deformable state out of the outlet openings between the internal wall and the fiber layer into the latter. Hence results the advantage that even the internal walls of channels and the like may be provided with a layer of a curable mass in a totally simple manner, wherein fastening to the wall of the channel or the like, of the fiber layer by means of fastening elements may be obviated. By the mass penetrating between the wall to be coated and the fiber layer, it is ensured that the fiber layer will be soaked completely.

According to a further preferred embodiment, it is proceeded in a manner that the flexible tube, prior to being introduced into a channel to be coated or the like, together with the fiber layer applied is arranged in folds extending substantially in the longitudinal direction and is sheathed by a packing tube, which, introduced into the channel to be coated or the like, is drawn off in the longitudinal direction immediately before blowing air into the flexible tube externally carrying the fiber layer. The flexible tube carrying the fiber layer and contained in the packing tube, thus, is most easily handleable when introduced into a channel to be coated. In addition, it is thereby possible to inflate the flexible tube carrying the fiber layer over a small path only, which moves on with the operation progress, wherein a relatively small and low-performing compressed-air source will be sufficient.

The introduction of the flexible tube carrying the fiber layer into a packing tube also offers the advantage that the fiber layer need not be connected with the flexible tube. It will do if the fiber layer merely rests on the external side of the flexible tube. Slipping of the fiber layer need not be feared because of the folding of the flexible tube upon application of the fiber layer and the fixation of the folds by the introduction of the same into the packing tube, fixation resulting from the inflation of the flexible tube immediately upon slitting and drawing off of the packing tube on grounds of the friction exerted by the fiber layer on the wall of the channel to be coated.

The lacking of a tight connection of the fiber layer with the flexible tube also has the advantage that the fiber layer may be scoured by the relatively fluent curable mass so as to yield a smooth and dense surface.

In order to be able to ensure uniform soaking of the fiber layer even when coating channels whose cross sections have relatively large vertical extensions, it is advantageous that the preferably liquid curable mass being in a plastically deformable state is introduced into the fiber layer in individual portions consecutively distributed over the periphery of the cross section, at least with cross sections having major vertical extensions. Any non-uniform distribution of the introduced mass caused by hydrostatic pressure differences is thereby safely avoided.

BRIEF DESCRIPTION OF THE DRAWINGS

In the following, the invention will be explained in more detail by way of the drawings, wherein:

FIG. 1 schematically illustrates a device according to the invention for carrying out the process of the invention;

FIG. 2 shows a pipe for introducing a plastic curable mass;

FIG. 3 is a section along line III—III of FIG. 2;

FIG. 4 is a section along line IV—IV of FIG. 2; and

DETAILED DESCRIPTION OF A PREFERRED EMBODIMENT OF THE INVENTION

Figure 5:
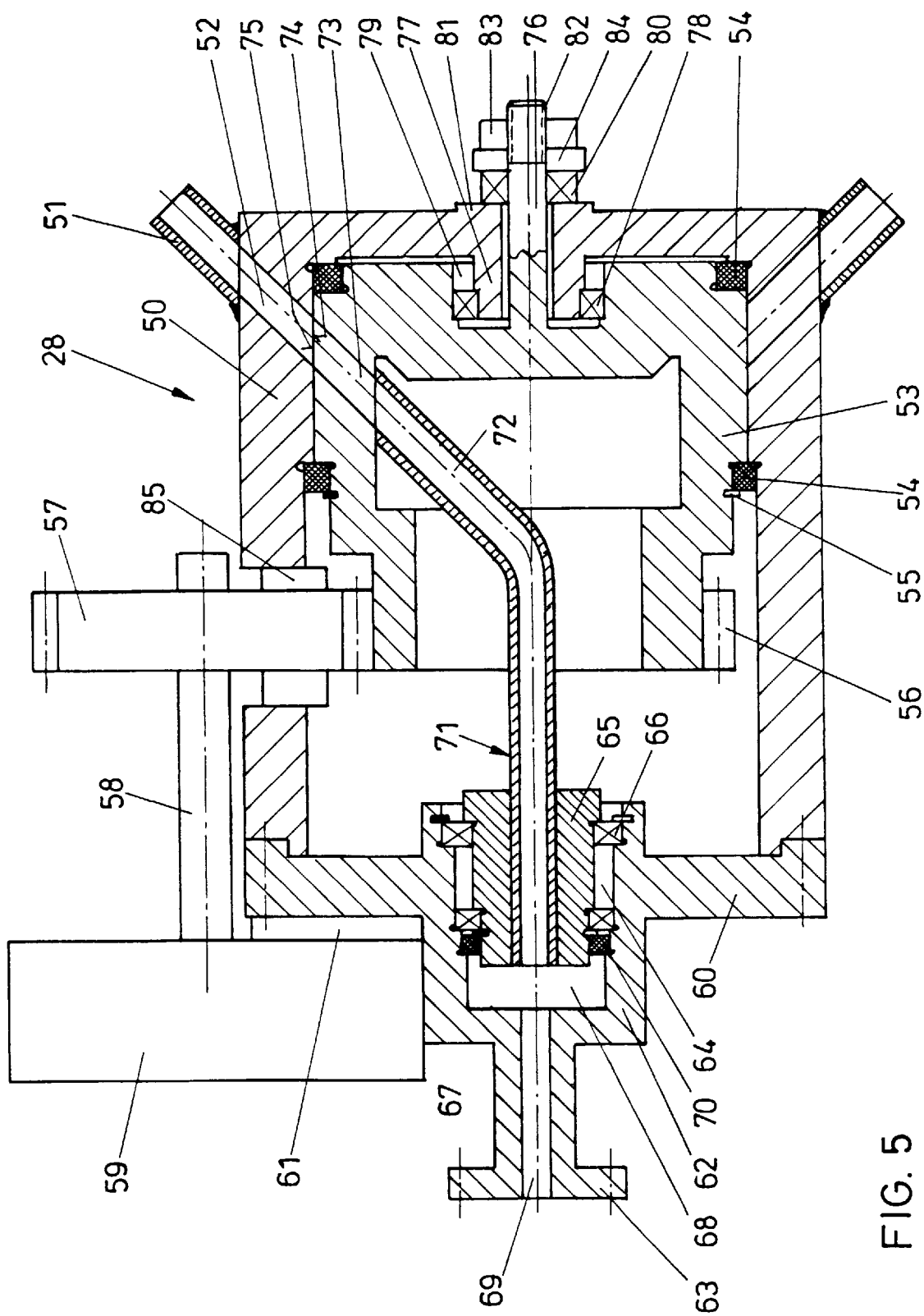
FIG. 5 represents a section through a distributing means for the curable mass.

As is apparent from FIG. 1, a device comprises a blower 1 which is provided with a seat 2 for a flexible tube 4 and with a supporting means 3. The flexible tube 4 on its external side is provided with a layer 5 of mutually engaging fibers, preferably a needle felt.

In the exemplary embodiment illustrated, the supporting means 3 comprises three telescopically extractable support feet 6 arranged to be offset by 120°.

Furthermore, the device comprises a shield 7, which serves to receive the flexible tube 4 together with its fiber layer 5 by a central bore. The central opening is surrounded by a socket 8 intended to assist in guiding the flexible tube 4.

As is, furthermore, apparent from FIG. 1, the shield 7 is dividedly designed, the edges of the four parts being provided with flanges 9 bearing against one another and connected with one another by means of quick-acting closures not illustrated.

The shield 7, which substantially corresponds to the cross section of a hollow space to be coated, e.g., a channel 10, is connected with a bogie 11. The connection of the bogie 11 with the shield 7 is realized by way of connecting plates 16 fastened to the end faces of longitudinal beams 12 and detachable fixing means passing through the same, such as, e.g., screws or quick-acting closures. The three longitudinal beams 12 used in the exemplary embodiment illustrated are interconnected by cross struts 13, which cross struts optionally are telescopically changeable in terms of length and are provided with connecting plates 14 on their ends in order to enable the readily detachable connection with the longitudinal beams 12.

The longitudinal beams 12 are provided with wheels 15 supported on the internal wall of the channel 10 to be coated.

Two rings 19 are held within the bogie 11 via further struts 17 likewise provided with connecting plates 18, through which rings the flexible tube 4 inserted in the channel 10 to be coated passes, said flexible tube 4 being retained in a packing tube 23 together with its fiber layer 4.

The two rings 19 are interconnected via pairs of cheeks 20, wherein drivable rollers 22 carrying circulating belts 21 are journaled in the pairs of cheeks 20. These rollers 22 and belts 21, respectively, are pressed to bear against the packing tube 23 so as to transmit an advance force thereonto.

The shield 7, in addition, carries a cutting means 24 via struts 25 substantially forming two triangles. These struts 25 carry two blades 26 which serve to slit the packing tube 23 in its longitudinal direction so as to divide the same into two strips. These two strips may be wound on two drivable winding rolls 27. Thereby, it is ensured that the flexible tube 4 provided with the fiber layer 5 may be passed through the central opening of the shield 7 tightly packed.

Furthermore, a distributing means 28 is carried in the bogie via struts 29 provided with connecting plates 30, which distributing means, via a flexible tube 31, is connected with a means for preparing the required curable mass not illustrated.

In addition, this distributing means 28, via supply tubes 32 indicated but in broken lines, is connected with pipes 33 uniformly distributed about the periphery of the shield 7 and illustrated in more detail in FIGS. 2 to 4.

In order to coat a hollow space, e.g., a channel 10, or its wall, a flexible tube 4 retained within the packing tube 23 and externally carrying a fiber layer 5 is inserted into the channel. In addition, the device is introduced into the channel 10 in the disassembled state via a relatively small access opening and is assembled there. After this, the packing tube 23 is conducted through the two rings 19 and slitted on its front end, the strips thus formed being fastened to the two winding rolls 27.

Moreover, the flexible tube 4 together with its fiber layer 5, has been passed through the central opening of the shield 7 in the tightly packed state and fastened to the seat 2 of the blower 1, which is stationarily held on the wall of the channel and immovably supported thereon.

By starting the blower 1, the flexible tube 4 is inflated such that the latter together with its fiber layer 5 comes to lie on the wall of the channel 10 to be coated, yet with the pipes 33 reaching to between the fiber layer 5 and the wall of the channel 10.

Via the distributing means 28, whose structure will be explained in more detail by way of FIG. 5, the individual pipes 33 uniformly distributed about the periphery of the shield 7 and illustrated in more detail in FIGS. 2 to 4 are consecutively supplied with substantially equal portions of curable mass emerging from the pipes 33 substantially in the direction towards the fiber layer 5, thus soaking the latter. The curable mass emerging from the pipes 33 at the same time causes the shield 7, and hence the movable part of the device, to be centered and guided.

Since the fiber layer 5 is connected with the flexible tube 4 at least not continuously therewith, a thin layer of curable mass is formed between the fiber layer and the outer side of the flexible tube 4, that contains hardly any fibers such that a very smooth surface results in the coated region of the channel 10.

The shield 7 together with the bogie 11 is being moved away from the blower 1 as operation is proceeding. The force required therefor substantially is applied by the overpressure prevailing within the flexible tube 4 and acting on the shield 7. Depending on the pressure prevailing within the flexible tube 4, which basically is a function of the requirement of the safe application of the fiber layer on the internal wall of the channel 10, an advance or braking force is exerted on the yet closed packing tube 23 by means of the drivable circulating belts 21, whose actuating means not illustrated are connected with a control circuit not illustrated, either, in order to attain the required advance speed which is determined with a view to ensuring the safe soaking of the fiber layer 5.

Said control circuit is connected with sensors 34, 34' responding to the curable mass and arranged on that side of the substantially triangular pipes 33—as visible from FIGS. 3 and 4—which faces the interior of the channel 10 and the fiber layer 5, respectively. These sensors may be simple contact platelets connected with a resistance measuring means. If there is curable mass between the contact platelets 34, the electric resistance will change between the same and may readily be detected by the resistance measuring means.

If the contacts forming the sensor 34 are not moistened, this means that the advance speed has been chosen too high and no complete soaking of the fiber layer 5 is guaranteed.

As is apparent from FIG. 2, the pipes 33 on their outflow-side end have an enlargement 35 in whose region the pipes 33 are cut off obliquely, said cuts being conducted in the longitudinal direction of the pipes 33 away from their surface lines facing the interior of the hollow space 10 obliquely towards outside to the wall 36 of the channel 10 and ending in the region of the surface lines facing the wall 36 of the channel 10 such that the outflow opening 37 of each pipe 33 will be covered. Thereby, it is ensured that the curable mass emerges substantially obliquely relative to the fiber layer 5, soaking the same.

In the region of the enlargement 35, lateral rims 38 are provided, which largely prevent the curable mass from spreading laterally immediately upon its emergence from a pipe 33 such that the curable mass, after having soaked the fiber layer 5, is able to flush around the rims 38 as indicated by arrows 39 in FIG. 4, propagating further only thereafter. The lateral rims 38 also largely prevent the emerging curable mass from propagating opposite to the incoming direction 40 immediately beside the pipe 33.

The propagation of the emerging curable mass after soaking of the respective region of the fiber layer 5 as indicated by the broken line 41 is maintained in a region located between the sensors 34 and 34' by appropriate control of the advance speed. In doing so, the advance speed is lowered if the contact pair forming the sensor 34 is not moistened any more and raised if the contact pair forming the sensor 34' is moistened by the curable mass.

The supply of the curable mass to the outflow opening 37 is effected via a flexible tube 42 circular in cross section and embedded in the pipes 33 having substantially triangular cross sections with changing wall thicknesses, which flexible tube 42 is capable of being connected with the supply tubes 32 coming from the distributing means 28 via suitable couplings (not illustrated). With a view to ensuring uniform charging of the pipes 33, all of the supply tubes 32 substantially have equal lengths.

In the region of the enlargements 35 of the pipes 33, ribs 44 extending in the longitudinal direction of the pipes 33 are molded to the section abutting on the wall 36 of the channel 10 in order to prevent the fiber layer from depositing directly on the outflow opening 37.

FIG. 5 illustrates a section through a distributing means 28. The latter comprises a pot-shaped stator 50 in one of whose end-side regions connecting means 51 for the supply tubes 32 are uniformly distributed over its periphery, leading to the pipes 33 arranged on the external periphery of the shield 7. The number of such connecting means 51 corresponds with the number of pipes 33. The connecting means are coaxially aligned with channels 52 passing through the stator 50 in the region of its shell.

A rotor 53 rotates within the stator 50 with but a slight play, wherein the rotor 53 is sealed relative to the housing by means of two seals 54, one seal being secured in its axial position by a Seeger circlip ring 55.

Furthermore, the rotor 53 is provided with a setoff carrying a gear rim 56. The latter is in mesh with a pinion 57 mounted in a rotationally fast manner on the shaft 58 of a gear motor 59 which, by means of a flange 61 and screws passing therethrough (not illustrated), is fastened to a shield 60 attached to the stator 50.

To the shield 60, a connection casing 62 is molded, which carries a central connection flange 63 serving to connect the flexible tube 31 conducting the curable mass to the distributing means 28 and communicating with a preparation means (not illustrated) for preparing the curable mass. Said connection casing 62 has a bore 64 for mounting a rotary part 65 by means of two ball bearings 66, 67.

Between the end side of the bore 64 and the end side of the rotary part 65 there is left free a reception space 68, into which a bore 69 also passing through the flange 63 opens. Said reception space 68 is sealed by means of a seal 70.

Furthermore, a bent pipe 71 is tightly retained in this rotary part 65, the second leg 72 of this pipe 71 being fastened, preferably by means of a welding seam, to the inner side of a shell section of the rotor 53, which likewise is substantially pot-shaped. The leg 72 of the pipe 71 is oriented coaxially with a channel 73 arranged in the shell section of the rotor 53 and whose stator-side mouth 74 is located in the plane of the rotor-side inlets 75 of the channels 52 of the stator 50.

As is apparent from FIG. 5, the axes of the channels 52 of the stator 50 lie on a common imaginary cone envelope surface, the leg 72 of the bent pipe 71 and hence also the channel 73 of the rotor 53 rotating along this cone envelope surface. Thereby, sharp deflections of the flow of the curable mass are avoided.

The rotor 53 is driven by the gear motor 59 via the pinion 57 engaging in an opening 85 of the shell section of the stator 50 as well as by the gear rim 56, whereby the stator-side opening 74 of the channel 73 of the rotor 53 successively sweeps by the rotor-side inlets 75 of the channels 52 of the stator 50, thus enabling the curable mass being under pressure to enter the respective channel 52 and, upon passing the same as well as the supply duct 32 connected thereto, to reach the pipes 33 distributedly arranged about the periphery of the shield 7 and to penetrate the fiber layer 5 via the same.

The rotor 53 on one of its end faces comprises a journal 76 passing through an inwardly directed hub 77 of the stator 50. On the outer side of this hub 78 there rests a ball bearing 78 inserted in a bore 79 of the rotor 53.

In order to secure the rotor 53 in its position, a thrust bearing 80 is arranged on the journal 76, which thrust bearing bears against the outer side of the end face 81 of the stator 50 and is adjustable by means of a nut 83 screwed on the end of the journal 76 provided with a thread 82 as well as by means of an intermediate ring 84.

What I claim is:

1. A device for coating the internal surfaces of elongate hollow spaces, said device comprises a shield substantially corresponding to the cross section of the hollow space and capable of being displaced in the longitudinal direction of the hollow space by means of a bogie connected therewith, said shield is connected with supply ducts for a curable mass being in the plastic state, said supply ducts are provided with outlet openings substantially uniformly distributed about the periphery of the cross section of the hollow space, wherein a blower is provided with a seat for a flexible tube capable of being pressed at the hollow space to be coated and substantially air-tight relative to the inner side of the hollow space and comprises a supporting means capable of being stationarily anchored within the hollow space, wherein the shield is provided with a central opening intended for the passage of the flexible tube containing a fiber material with an impermeable layer and the supply ducts are connected with a distributing means for the curable mass carried by the bogie and terminate in pipes arranged about the external periphery of the shield, the outlet openings of said pipes substantially are formed by a cut led obliquely to the longitudinal axes of the pipes, terminating on pipe enveloping lines next to the internal wall of the hollow space.

2. A device as set forth in claim 1, wherein the shield is connected with at least two cutting means and two coiling means which are driven to receive strips of a packing tube.

3. A device as set forth in claim 2, wherein the shield and its bogie, are in connection with at least two drivable rollers carrying circulating belts arranged in the region of a cross sectional plane of the hollow space and provided for application at the flexible tube.

4. A device as set forth in claim 3, wherein the shield and the bogie are designed in several parts and detachable fastening means, are provided for connecting the individual parts.

5. A device as set forth in claim 4, wherein the pipes arranged about the external periphery of the shield have substantially triangular cross sections and the region of each respective outlet opening includes rims projecting towards the interior of the hollow space with an enlargement means being provided in this region.

6. A device as set forth in claim 5, wherein the pipes, in the region of their outflow openings, on their wall regions substantially lying at the internal wall of the hollow space are provided with ribs projecting towards the interior of the hollow space and extending in the longitudinal direction of the pipes.

7. A device as set forth in claim 5, wherein at least two sensors are arranged in an offset manner in the longitudinal direction of the pipes and are provided in regions of the pipes close to the outflow openings on their sides facing.

8. A device as set forth in claim 1, wherein the distributing means connected with the supply ducts comprises an actuatable cylindrical rotor including a channel open on its outer surface area and provided with a feed duct for the curable mass, wherein the rotor rotates within a stator encompassing said rotor and is provided with channels uniformly distributed about its circumference and passing through its wall, the number of said channels corresponds to the number of supply ducts and pipes of the shield, and said channels are connectable with the supply ducts and, on their inlets facing the rotor, are located in the moving path of the stator-side opening of the channel of the rotor.

9. A device as set forth in claim 8, wherein the axis of the channel in the rotor and the axes of the channels in the stator lie on a common imaginary surface area of a cone.

10. A device as set forth in claim 8, wherein the channel arranged in the rotor on its internal wall facing the axis of rotation is connected with a bent pipe, one leg of which is mounted coaxial with the axis of rotation of the rotor in a supply casing to which a flexible tube carrying the curable mass is axially connected.

11. A device as set forth in claim 8, wherein all of the supply ducts have equal lengths between the distributing means and the pipes arranged on the outer edge of the shield.

12. A process for applying a coating of a fiber-reinforced curable mass including a binder onto the internal wall of a channel using a device according to claim 1, wherein, by means of a displaceable shield, a layer of mutually engaging fibers, preferably forming a needle felt, is applied onto the substrate and this layer is soaked with the mass being in a plastically deformable state and applied through outlet openings in a manner distributed about the periphery of the substrate to be coated, whereupon the mass is allowed to cure.

13. A process as set forth in claim 12, wherein the layer of mutually engaging fibers is applied externally on a substantially air-tight flexible tube from the shield and the flexible tube is progressively pressed at the internal wall of the channel by blowing in air while simultaneously pressing the mass which is in a plastically deformable state, out of the outlet openings between the internal wall and the fiber layer into the fiber layer.

14. A process as set forth in claim 13, wherein the flexible tube, prior to being introduced into a channel to be coated together with the fiber layer applied is arranged in folds extending substantially in the longitudinal direction and is sheathed by a packing tube, which, introduced into the channel to be coated is drawn off in the longitudinal direction immediately before blowing air into the flexible tube externally carrying the fiber layer.

15. A process as set forth in claim 12, wherein the preferably liquid curable mass being in a plastically deformable state is introduced into the fiber layer from the outlet openings in individual portions consecutively distributed over the periphery of said cross section, at least with cross sections having major vertical extensions.

* * * * *